Patented June 20, 1939

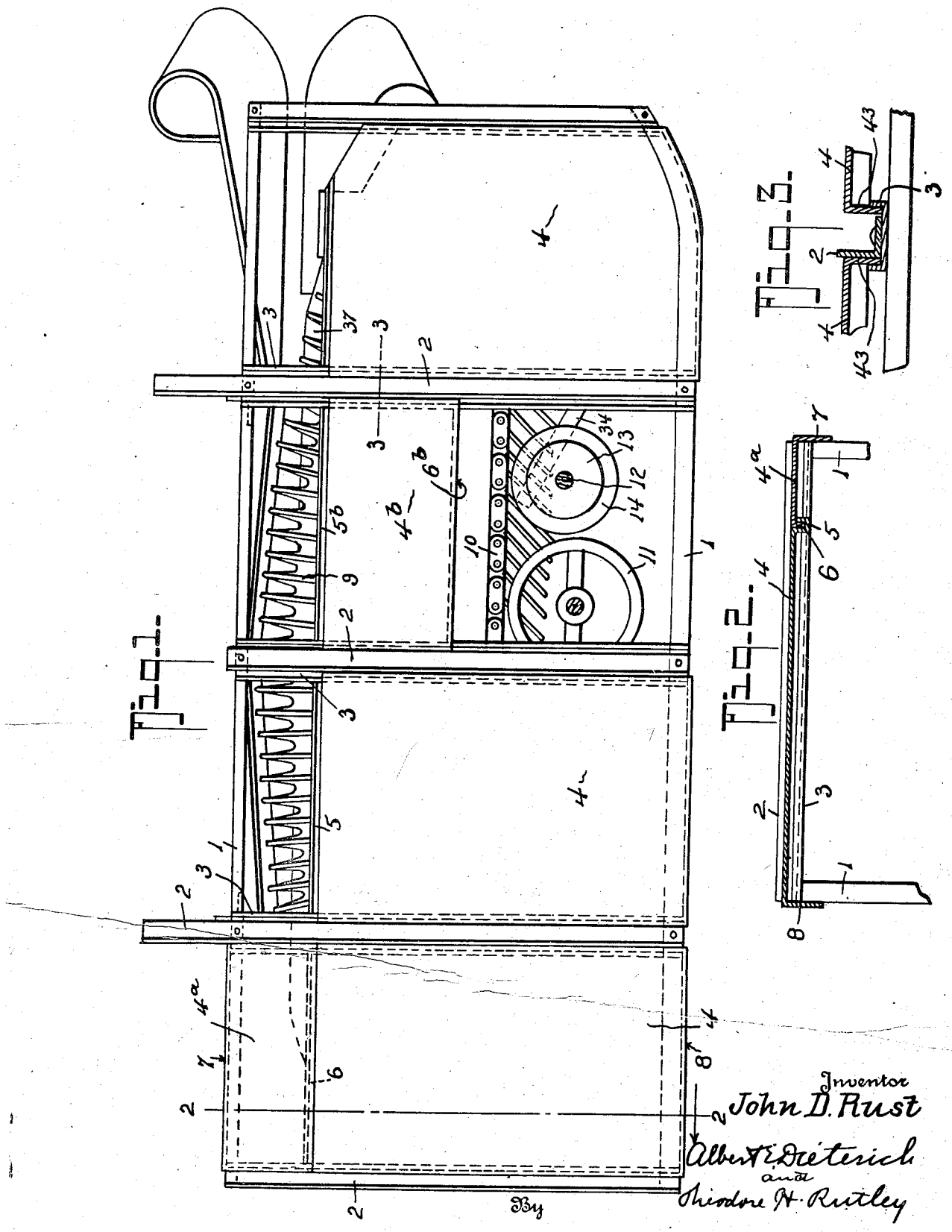

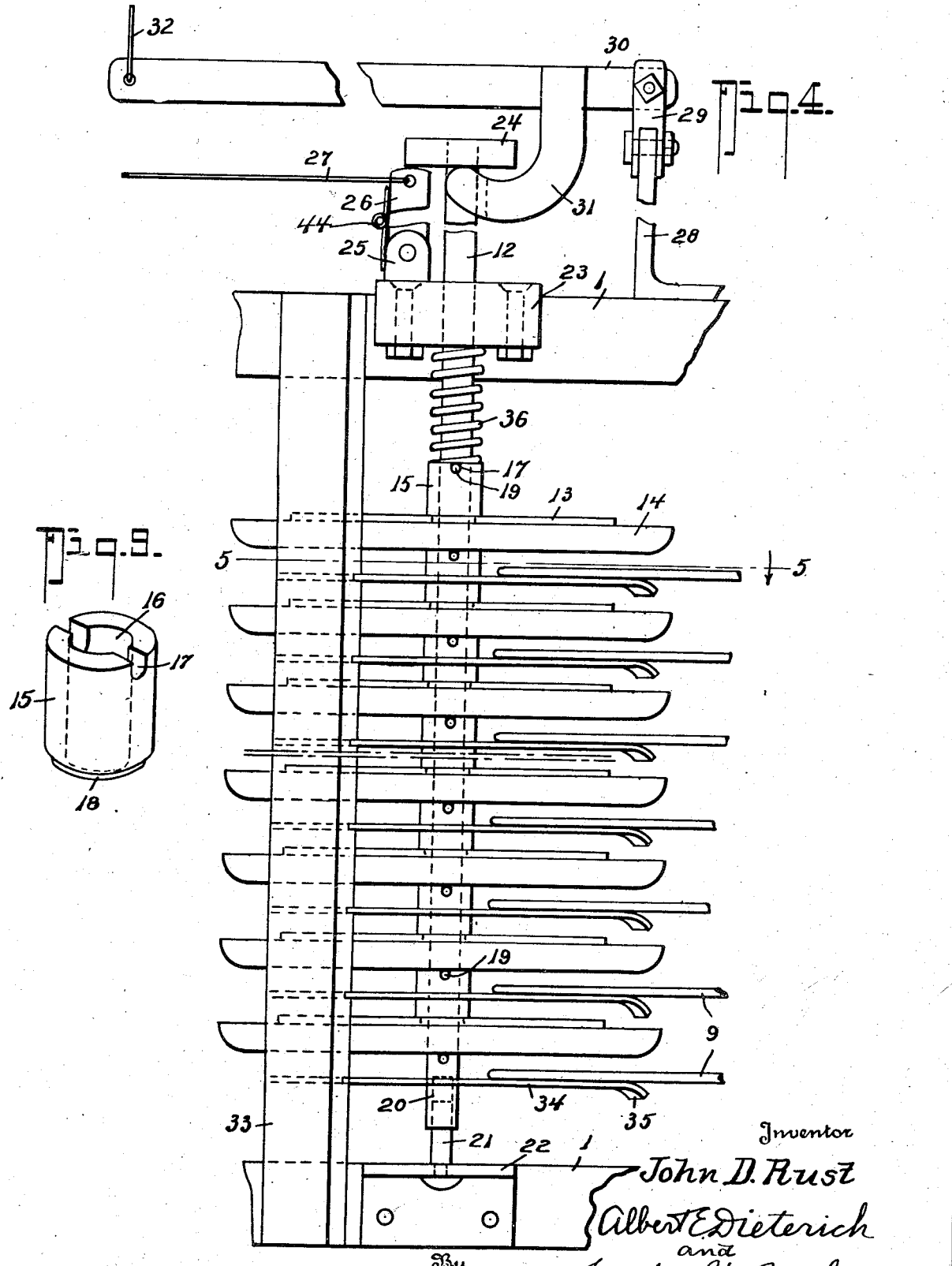

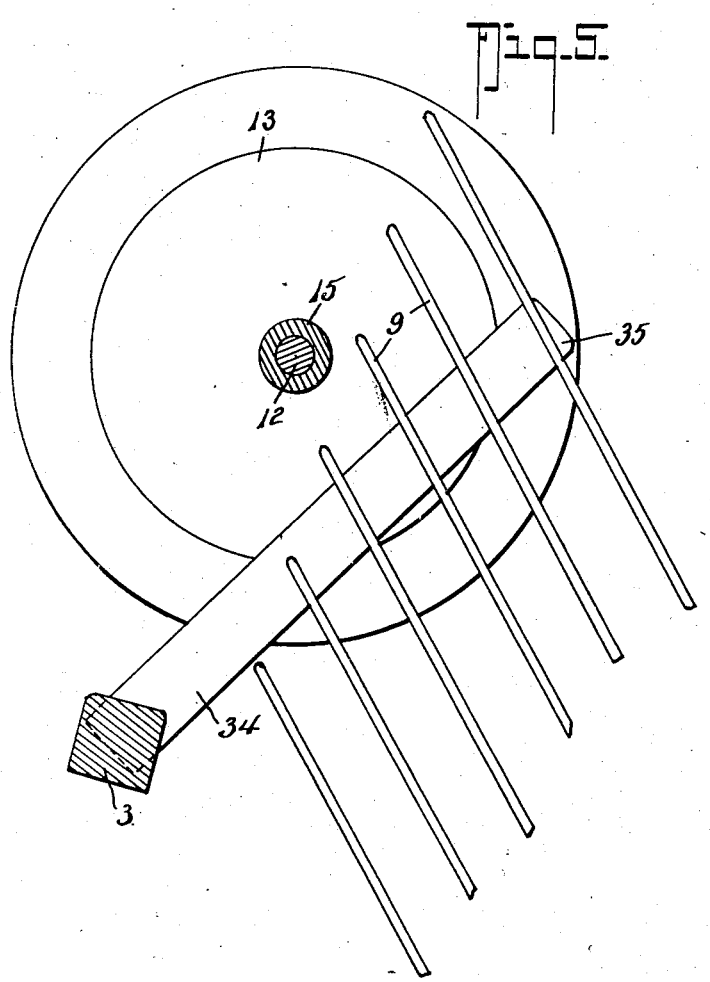
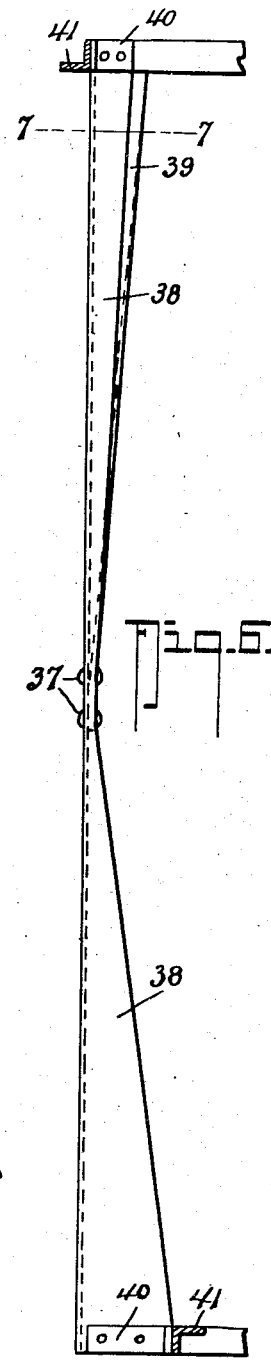
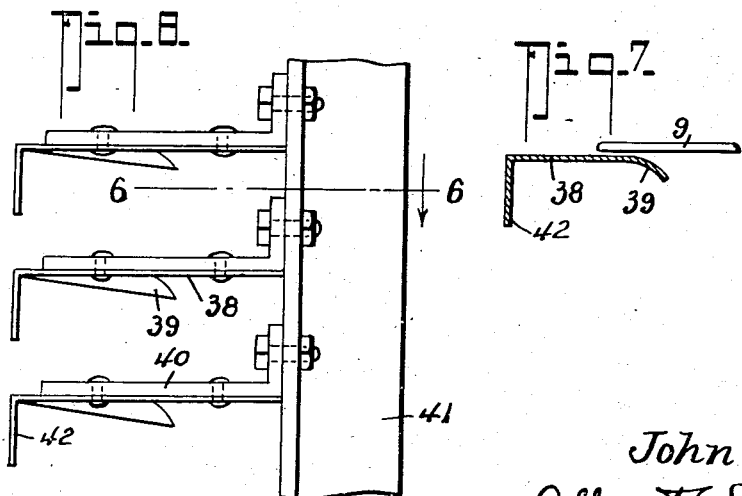

2,162,750

UNITED STATES PATENT OFFICE 2,162,750

COTTON PICKING MACHINE

John D. Rust, Memphis, Tenn.

Application September 20, 1937, Serial No. 164,809

20 Claims. (Cl. 56—42)

My invention relates to certain new and useful improvements in the cotton pickers of the type disclosed in U. S. Letters Patent: #1,910,307 of May 23,1933; Re. #19,411 of Jan. 1, 1934; #1,894,198 of Jan. 10, 1933; #2,058,513 of Oct. 27, 1936; #2,023,491 of Dec. 10, 1935; #2,058,514 of Oct. 27, 1936; #2,073,653 of Mar. 16, 1937; #2,076,598 of Apr. 13, 1937; #2,085,046 of June 29, 1937; and application Serial #98,944.

It particularly seeks to provide an improved means to roughen the spindles, which means is under the operator's control to be rendered operative or not operative at will.

A further object is to improve the stalk guard of the machine so as to reduce manufacturing costs, to provide a structure which will not become clogged with cotton and to provide means to hold the stalk guards proper in a rigid position so that the pressure of cotton stalks cannot crowd them in against the moving spindle slats at the center of the picking space where they come in proximity with each other.

Further, the invention has for its object to provide a stalk guard composed of guard units rigidly held in position at their ends and of such design as to give a cantilever arrangement which has been found to give the desired result.

Another object is to provide a rain-shedding cover arrangement, similar to that disclosed in Patent #2,076,598 aforesaid, but in which the covers are made with removable sections over the picking tunnel so that the operator, by removing such sections, can observe the action of the spindles in passing into and out of the plants, and can inspect the machine for bent spindles, and the like, without moving from his seat.

Other objects will in part be obvious and in part be pointed out hereinafter.

To the attainment of the aforesaid obects and ends the invention still further resides in the novel details of construction, combination and arrangement of parts, all of which will be first fully described in the following detailed description, and then be particularly pointed out in the appended claims, reference being had to the accompanying drawings, in which:

Fig. 1 is a top plan view of a cotton picking machine embodying my invention, certain cover sections being removed and certain parts being shown in section.

Fig. 2 is a detail cross section on the line 2—2 of Fig. 1.

Fig. 3 is a detail section on the line 33 of Fig. 1.

Fig. 4 is an enlarged detail elevation, parts being broken away, showing the new and improved spindle roughening means.

Fig. 5 is a horizontal section on line 5—5 of Fig. 4.

Fig. 6 is a detail plan view of the stalk guard.

Fig. 7 is a detail section on the line 7—7 of Fig. 6.

Fig. 8 is a detail rear elevation of the stalk guard.

Fig. 9 is an enlarged detail perspective view of one of the thimbles used in the spindle roughener.

In the drawings, in which like numbers of reference designate like parts in all of the figures, 1 represents the frame of the machine, 2 the top cross angles, and 3 the gutter strips in which the side flanges 43 of the covers rest (see Fig. 3).

The covers or lids are composed of two or more sections 4, 4ª and 4ᵇ, the section 4ª overlying the picking tunnel through which the plants are passed. Where the cover sections join one another, one section, say 4, is provided with a U-shaped channel 5 in which a flange 6 of the adjacent section, say 4ª, rests. The sections 4ª have outer side flanges 7, while the cover sections 4 have outer side flanges 8 (see Fig. 2).

The spindles 9, chains 10, doffer 11, may all be of known construction and per se do not comprise a part of the present invention. The doffer 11, may for example, be of the same construction as the auxiliary doffer shown and described in Letters Patent #2,023,491 aforesaid.

Mounted to rotate in a suitable bearing bracket 23 and to be longitudinally (vertically) adjustable therein is a shaft 12 carrying a series of thimbles 15 having bores 16, slots 17 and reduced portions 18. Spring steel discs 13 are securely held on the reduced portions 18 in any suitable way, as for example, passing the reduced portions through holes in the discs and upsetting the same. These discs 13 engage the abrasive wheels 14 frictionally and act as a brake thereon as well as holding the wheels yieldingly against the spindles when the assembly is lowered to operating position.

Between the thimbles on the shaft 12 are placed a series of abrasive wheels 14 of any approved material and physical characteristics, these wheels being held in place by pins 19 passing through holes in shaft 12 and lying in slots 17.

At its lower end shaft 12 is bored as at 20 to fit over a guide stud 21 held by a bracket 22 secured to a suitable part of the frame 1 of the machine. The shaft also has a disc-like head 24 under which the lifting lever's claw 31 engages. The lifting lever 30 is pivoted, at one end, to a link 29 that is in turn pivoted to a bracket 28 mounted on a suitable part of the frame 1, and, at its other end, a pull cord 32 is attached to the lever. By pulling up on cord 32 the entire gang of wheels 14 are lifted clear of the spindles. The wheels are held clear by means of a latch 26 pivoted, at one end, to ears 25 on bracket 23 and, at the other end, a pull cord 27 is attached to the lever. A spring 44, suitably secured to bracket 23 or ears 25, engages latch 26 and continuously tends to move it to a vertical position (see Fig. 4).

On an upright rigid support 33 is carried a set of spring steel arms 34 which are adapted to project between adjacent wheels 14 and to underlie the spindles 9 so as to maintain the spindles in contact with the abrasive wheels 14 when the latter are lowered to an operating position with respect to the spindles.

The arms 34 have bent-down ends 35 to ensure any bent spindles passing over the top side of the bars.

When latch 26 is released from under head 24 the shaft 12 and parts carried thereby will gravitate to their operative position provided cord 32 is slacked. In order to aid gravity, a spring 36 may be provided, as shown in Fig. 4.

The improved stalk guard is shown in Figs. 6, 7 and 8, by reference to which it will be seen that each guard bar is constructed of sheet metal to provide a top portion 38 and an inner vertical flange 42 (adjacent the tunnel). This flange 42 runs straight from the end upright angle 41 adjacent one end of the machine to similar angle 41 at the other end of the machine and is there secured to the upright by brackets 40.

In order to facilitate entrance of the spindles between adjacent guard bars, the bars have bent-over portions 39. While the tunnel-side flanges of the guard bars are in a straight line, the inner side tapers toward the center or mid-length of the bar and there the bent over edge 39 is riveted at 37 to the flange 42 (see Fig. 6). This forms a rigid cantilever structure and thus prevents the cotton stalks from being pressed into the spindle-carrying slats at the center of the picking space where they come in close proximity with each other.

While I have shown the abrasive wheels 14 as working above the spindles and the arms 34 below the same, the assembly may be reversed so that the spindles will pass under arms 34 and over wheels 14, and the wheels 14 may be moved out of contact with the spindles by lowering the shaft 12, instead of raising the same, but as that is such an obvious modification I have not deemed it necessary to illustrate the same.

Other modifications may be made in the spindle roughening means, and modifications may also be made in the other elements of the invention by those skilled in the art without departing from the spirit of the invention and the scope of the appended claims.

From the foregoing description, taken in connection with the accompanying drawings, it is thought that the construction, operation and advantages of the invention will be clear to those skilled in the art to which it appertains.

What I claim is:

1. In a cotton picking machine, wherein is provided a tunnel through which the plants are passed, and an endless spindle carrier with means to project the spindles into and withdraw them from the tunnel; stalk guards for the spindle carrier, said guards each comprising an elongated horizontal bar having a vertical flange extending in one plane at the tunnel side and having a bent flange at the other side, means to support the bar at its ends, the bar in plan view being in the nature of a cantilever.

2. In a cotton picking machine, wherein rotary spindles are carried on endless conveyors, means to roughen the spindles, said means comprising a gang of abrasive wheels over the surface of which the spindles are adapted to be drawn, and a shaft carrying said wheels.

3. In a cotton picking machine, wherein rotary spindles are carried on endless conveyors, means to roughen the spindles, said means comprising a gang of abrasive wheels over the surface of which the rotary spindles are adapted to be drawn, and a shaft rotatably carrying said wheels.

4. In a cotton picking machine, wherein rotary spindles are carried on endless conveyors, means to roughen the spindles, said means comprising a gang of abrasive wheels over the surface of which the rotating spindles are adapted to be drawn, and a shaft carrying said wheels and springy discs on said shaft to engage said wheels.

5. In a cotton picking machine, a plurality of rows of travelling picking spindles, means for roughening the picking portions of said spindles, and means to render said roughening means operative and inoperative at the will of the operator, said roughening means comprising a vertical shaft, a set of abrasive wheels on said shaft, one wheel for each row of spindles.

6. In a cotton picking machine, a plurality of rows of travelling picking spindles, means for roughening the picking portions of said spindles, and means to render said roughening means operative and inoperative at the will of the operator, said roughening means comprising a vertical shaft, a set of abrasive wheels on said shaft, one wheel for each row of spindles, and operator-controlled means to remove said wheels from the path of said spindles when desired.

7. In a cotton picking machine, a plurality of rows of travelling picking spindles, means for roughening the picking portions of said spindles, and means to render said roughening means operative and inoperative at the will of the operator, said roughening means comprising a vertical shaft, a set of abrasive wheels on said shaft, one wheel for each row of spindles, and operator-controlled means to remove said wheels from the path of said spindles when desired, said last-named means comprising elements on the shaft to engage the wheels, a lever device to shift the shaft, and a latch device to hold the shaft in shifted position.

8. In a cotton picking machine, a plurality of rows of travelling picking spindles, means for roughening the picking portions of said spindles, and means to render said roughening means operative and inoperative at the will of the operator, said roughening means comprising a vertical shaft, a set of abrasive wheels on said shaft, one wheel for each row of spindles and a resilient disc on the shaft for each abrasive wheel to yieldingly press the wheels against the spindles.

9. In a cotton picking machine, a plurality of rows of travelling picking spindles, means for roughening the picking portions of said spindles, said roughening means comprising a vertical shaft, a set of abrasive wheels on said shaft, one wheel for each row of spindles, and operator-controlled means to remove said wheels from the path of said spindles when desired and a resilient disc on the shaft for each abrasive wheel to yieldingly press the wheels against the spindles.

10. In a cotton picking machine, a plurality of rows of travelling picking spindles, means for roughening the picking portions of said spindles, said roughening means comprising a vertical shaft, a set of abrasive wheels on said shaft, one wheel for each row of spindles, and operator-controlled means to remove said wheels from the path of said spindles when desired, said last-named means comprising elements on the shaft to engage the wheels, a lever device to shift the shaft, a latch device to hold the shaft in shifted position, and a resilient disc on the shaft for each abrasive wheel to yieldingly press the wheels against the spindles.

11. In a cotton picking machine, a plurality of rows of travelling picking spindles, means for roughening the picking portions of said spindles, and means to render said roughening means operative and inoperative at the will of the operator, said roughening means comprising a vertical shaft, a set of abrasive wheels on said shaft, one wheel for each row of spindles and means to engage the spindles on the side opposite the side engaged by the abrasive wheels to hold the spindles against the abrasive wheels when the latter are in their operative position.

12. In a cotton picking machine, a plurality of rows of travelling picking spindles, means for roughening the picking portions of said spindles, said roughening means comprising a vertical shaft, a set of abrasive wheels on said shaft, one wheel for each row of spindles, operator controlled means to remove said wheels from the path of said spindles when desired and means to engage the spindles on the side opposite the side engaged by the abrasive wheels to hold the spindles against the abrasive wheels when the latter are in their operative position.

13. In a cotton picking machine, a plurality of rows of travelling picking spindles, means for roughening the picking portions of said spindles, said roughening means comprising a vertical shaft, a set of abrasive wheels on said shaft, one wheel for each row of spindles, operator controlled means to remove said wheels from the path of said spindles when desired, said last named means comprising elements on the shaft to engage the wheels, a lever device to shift the shaft and a latch device to hold the shaft in shifted position and means to engage the spindles on the side opposite the side engaged by the abrasive wheels to hold the spindles against the abrasive wheels when the latter are in their operative position.

14. In a cotton picking machine, a plurality of rows of travelling picking spindles, means for roughening the picking portions of said spindles, and means to render said roughening means operative and inoperative at the will of the operator, said roughening means comprising a vertical shaft, a set of abrasive wheels on said shaft, one wheel for each row of spindles and a resilient disc on the shaft for each abrasive wheel to tend to press the wheels against the spindles, and means to engage the spindles on the side opposite the side engaged by the abrasive wheels to hold the spindles against the abrasive wheels when the latter are in their operative position.

15. In a cotton picking machine, a plurality of rows of travelling picking spindles, means for roughening the picking portions of said spindles, said roughening means comprising a vertical shaft, a set of abrasive wheels on said shaft, one wheel for each horizontal row of spindles, operator-controlled means to remove said wheels from the path of said spindles when desired, a resilient disc on the shaft for each abrasive wheel to yieldingly press the heels against the spindles, and means to engage the spindles on the side opposite the side engaged by the abrasive wheels to hold the spindles against the abrasive wheels when the latter are in their operative position.

16. In a cotton picking machine, a plurality of rows of travelling picking spindles, means for roughening the picking portions of said spindles, said roughening means comprising a vertical shaft, a set of abrasive wheels on said shaft, one wheel for each row of spindles, operator-controlled means to remove said wheels from the path of said spindles when desired, said last-named means comprising elements on the shaft to engage the wheels, a lever device to shift the shaft and a latch device to hold the shaft in shifted position, a resilient disc on the shaft for each abrasive wheel to yieldingly press the wheels against the spindles, and means to engage the spindles on the side engaged by the abrasive wheels to hold the spindles against the abrasive wheels when the latter are in their operative position.

17. In a cotton picking machine, a plurality of rows of travelling picking spindles, means for roughening the picking portions of said spindles, means to render said roughening means operative and inoperative at the will of the operator, said roughening means comprising a vertical shaft, a set of abrasive wheels on said shaft, one wheel for each row of spindles, a stationary support, and a set of springy arms projecting between adjacent abrasive wheels to engage the spindles and press them toward the abrasive wheels.

18. In a cotton picking machine, a plurality of rows of travelling picking spindles, means for roughening the picking portions of said spindles, said roughening means comprising a vertical shaft, bearings for said shaft, means to shift said shaft lengthwise, a set of abrasive rotatable wheels on said shaft, one wheel for each row of spindles, thimbles on said shaft between adjacent wheels, pins passing transversely through said shaft beneath said wheels and inter-engaged with said thimbles to hold same against rotation on the shaft, and a set of springy discs secured to said thimbles and engaging said wheels to retard their rotation on the shaft.

19. In a cotton picking machine, an endless carrier having a plurality of rows of spindles, stalk guards between which the spindles project during their picking interval, guard supports adjacent the ends of the machine, said guards comprising horizontally disposed cantilever bars spaced apart and having depending flanges beneath which the spindles pass, the spindles passing through the spaces between adjacent bars.

20. A cotton picking machine comprising a housing having side and end walls, the end walls having openings for the passage of plants into and out of the housing, said housing including transverse channel plates at the top spaced apart in the longitudinal direction of the machine and removable lids bridging the spaces between said channel plates and having flanges to overlie the flanges of the channel plates, said channel plates functioning as gutters to deflect water to and over the side walls of the machine, and a cotton picking mechanism located within the housing, said lids being formed of detachably inter-engaged sections in virtue of which the sections over the plant passage may be separately removed whereby the operator can view the action of the spindles on the plants while the machine is in operation.

JOHN D. RUST.